(12) United States Patent
Hamada

(10) Patent No.: US 7,986,620 B2
(45) Date of Patent: Jul. 26, 2011

(54) RADIO BASE STATION

(75) Inventor: Seiji Hamada, Yokosuka (JP)

(73) Assignee: Fujistu Limited, Kawasaki (JP)

( * ) Notice: Subject to any disclaimer, the term of this patent is extended or adjusted under 35 U.S.C. 154(b) by 1037 days.

(21) Appl. No.: 11/176,559

(22) Filed: Jul. 8, 2005

(65) Prior Publication Data

US 2006/0193253 A1    Aug. 31, 2006

(30) Foreign Application Priority Data

Feb. 28, 2005  (JP) ................................. 2005-054819

(51) Int. Cl.
    *G01R 31/08* (2006.01)
(52) U.S. Cl. ....................................... 370/229; 370/328
(58) Field of Classification Search .................. 370/229, 370/328, 342, 335; 375/147, 130, 140, 342
    See application file for complete search history.

(56) References Cited

U.S. PATENT DOCUMENTS

| 6,650,692 | B2 * | 11/2003 | Inoue et al. | 375/147 |
| 7,187,667 | B1 * | 3/2007 | Minowa et al. | 370/335 |
| 7,308,015 | B2 * | 12/2007 | Takano et al. | 375/130 |
| 7,327,717 | B2 * | 2/2008 | Borowski et al. | 370/350 |
| 2004/0127221 | A1 * | 7/2004 | Takano et al. | 455/445 |
| 2005/0081037 | A1 * | 4/2005 | Kumagai et al. | 713/175 |
| 2005/0088996 | A1 * | 4/2005 | Kawamura et al. | 370/335 |
| 2006/0083191 | A1 * | 4/2006 | Niwano et al. | 370/328 |
| 2008/0014978 | A1 * | 1/2008 | Kaneko et al. | 455/522 |

FOREIGN PATENT DOCUMENTS

JP    2000-151558    5/2000

OTHER PUBLICATIONS

3GPP TS 25.212 v6.2.0 (Jun. 2004); $3^{rd}$ Generation Partnership Project; Technical Specification Group Radio Access Network; Multiplexing and Channel Coding (FDD) (Release 6).
U.S. Appl. No. 09/322,444 (Corresp. To Japanese Patent Application 2000-151558).

* cited by examiner

*Primary Examiner* — Ricky Ngo
*Assistant Examiner* — David Oveissi
(74) *Attorney, Agent, or Firm* — Myers Wolin, LLC

(57) ABSTRACT

To improve accuracy for verifying reception in the data transmission utilizing the common channel. A radio communication apparatus for transmitting the data to the transmitting destination apparatus selected from a plurality of transmitting destination apparatuses using the shared channel, comprises a control unit for controlling data transmission and a path search unit for identifying the transmitting destination apparatus as the object of the path search in accordance with control of data transmission.

9 Claims, 11 Drawing Sheets

RADIO BASE STATION

CROSS REFERENCE TO RELATED APPLICATION

This application is related to and claims priority to Japanese Application No. 2005-0548195 filed Feb. 28, 2005 in the Japanese Patent Office, the contents of which are incorporated by reference herein.

BACK GROUND OF THE INVENTION

1. Field of the Invention

The present invention relates to a radio communication apparatus (CDMA radio communication apparatus) and more specifically to a radio communication apparatus used in a mobile radio communication system employing the UMTS (WCDMA) communication system or in a radio LAN system.

2. Description of the Related Art

A CDMA radio communication apparatus is required to provide a despread processing function within a receiving unit in order to receive a radio signal having completed a spreading process with a spreading code.

Namely, it is required to perform the despreading process with multiplication or the like of the received signal and the despreading code.

Here, importance lies in the timing of the multiplication of the received signal and despreading code. Therefore, the timing for obtaining higher correlation by shifting little by little the phase for the despreading code for the received signal is identified and the multiplication of the despreading code and received signal is performed using this identified timing.

In general, the CDMA radio communication apparatus obtains, for so-called RAKE combining for effective use of the signal received via multi-path, a relationship between the relative phase and correlation as a delay profile using a circuit called a searcher, identifies a plurality of timings for obtaining higher correlation, and thereafter sends a notice to the despread processing unit to perform the despread processing using the identified timing.

However, when the CDMA radio communication apparatus is required to process the received signal of a plurality of systems (corresponding to a plurality of users, for example), it is required to provide a searcher corresponding to each system, but the searcher has a comparatively large size structure and it is not desirable to provide this searcher corresponding to each system.

Accordingly, a method has been proposed in which the searcher is used in common among a plurality of systems (among a plurality of users) to prevent enlargement of the circuit structure by utilizing the searcher on a time division basis.

For example, the Japanese Patent Application JP-A No. 151558/2000 discloses that higher priority is given to a newly established communication channel or to a communication channel in which the delay profile is changed to a large extent or to a communication channel in which an error rate is deteriorated and a path detecting unit is operated based on this priority sequence.

On the other hand, in recent years, a system has been proposed in which reception of data is verified. In this system a first radio communication apparatus transmits burst data via a shared channel to a second radio communication apparatus and then the second radio communication apparatus transmits a response signal, which indicates whether the reception succeeded or not, to the first radio communication apparatus for verification of reception.

For example, HSDPA (High Speed Downlink Packet Access) has been considered as an example of such system. The HSDPA is a system to be adapted to the UMTS (WCDMA) communication system for enabling a high speed packet transmission system utilizing the shared channel of the descending direction (down-link). Moreover, for a radio LAN communication system, a similar high speed packet transmission system utilizing the shared channel has also been proposed.

The HSDPA employs the H-ARQ (Hybrid Automatic Repeat request) system. In H-ARQ, a mobile station sends a re-transmission request (the NACK signal is transmitted) to a base station when the mobile station has detected an error in the received signal from the base station. The base station which has received this re-transmission request retransmits the data. Therefore, the mobile station effectively uses the data using the received data and the received re-transmitted data. As explained above, generation of useless transmission is eliminated by effective use of the data received. When an error is not detected in the received data, the mobile station transmits the ACK signal. Accordingly, the base station can detect the successful reception of the transmitted data and shifts to the transmission mode for the next data.

However, if the ACK signal is not received within a predetermined period or the NACK signal has been received, the base station shifts to the re-transmission mode for the data transmitted.

The HSDPA employs not only data transmission using the shared channel explained above but also the adaptive modulation and coding (AMC) system.

The adaptive modulation control is performed to adaptively control the transmission method for data transmission.

For instance, a receiving station receives the signal transmitted from a transmitting station, measures the radio environment between the transmitting station and receiving station (radio environment of the down-link) using the same received signal, and transmits the result of measurement to the transmitting station. The transmitting station changes adaptively the transmission method on the basis of the result of the measurement.

The typical changes in the transmission method include, for example, a change of the QPSK modulation scheme to the 16QAM modulation scheme, a change in the number of spreading codes used for transmission, and a change in the data size (packet length) to be transmitted, or the like.

Next, the main radio channels used in the HSDPA will be explained. As the exclusive channels for the HSDPA, the HS-PDSCH (High Speed-Physical Downlink Shared Channel) and HS-DPCCH (High Speed-Dedicated Physical Control Channel) have been prepared.

Both HS-SCCH and HS-PDSCH are shared channels for downlink (namely, the direction to the mobile station from the base station) and the HS-SCCH is the control channel for transmitting various parameters of data transmitted by the HS-PDSCH. Various parameters are as follows.

a. Modulation scheme information indicating the modulation scheme used
  b. Information of the spreading code to be assigned
  c. Pattern information of the rate matching process to be implemented before transmission On the other hand, the HS-DPCCH is the individual control channel (Dedicated Control Channel) used for the up-link (namely, the direction to the base station from the mobile station). For instance, the HS-DPCCH is used by the mobile station for respectively transmitting acknowledgment or non-acknowledgment of reception of data received from the base station via the HS-PDSCH to the base station as the ACK signal and NACK signal (response signal).

If the mobile station has failed in reception of data (when a CRC error is detected in the received data), since the NACK signal is transmitted from the mobile station as the re-transmission request, the base station executes the re-transmission control. Moreover, if neither the ACK signal nor the NACK signal is received, the radio base station also performs the re-transmission control. Accordingly, it may be considered as one of the re-transmission requests that the mobile station enters the DTX state in which neither the ACK signal nor the NACK signal is transmitted.

Moreover, the HS-DPCCH is also used for transmitting the reception quality information (for example, SIR) of the received signal from the base station measured by the mobile station to the base station as the CQI information (Channel Quality Indicator). The base station changes the transmission method in the down-link based on the CQI information received. Namely, when the CQI information indicates a good radio environment of the down-link, the transmission method is switched to a modulation scheme for transmitting the data at a higher transmission rate. Moreover, when the CQI information indicates a rather bad radio environment of the down-link, the transmission method is switched to a modulation scheme for transmitting the data at a lower transmission rate (namely, the adaptive modulation control is performed).

[Channel Format]

Here, the channel format in the HSDPA will be explained.

FIG. 1 is a diagram illustrating a channel format in the HSDPA. Since the W-CDMA employs the code division multiplex system, each channel is separated by the code.

First, the channels not yet explained will be explained briefly.

The CPICH (Common Pilot Channel) is the common channel of the down-link and is transmitted to all mobile stations in the radio zone (cell).

The CPICH is used for the following various processes in the mobile station and is the channel for transmitting the so-called pilot signal (known signal).

Channel estimation

Cell search

Timing reference of the other down-physical-channel in the same cell

Next, timing relationship of the channel will be explained with reference to FIG. 1.

As illustrated in the figure, each channel forms one frame (10 ms) with 15(=3·5) slots (each slot corresponds to 2560 chip-length). As explained previously, since the CPICH is used as the reference for the other channels, the starting frames of the P-CCPCH and the HS-SCCH are matched with the starting frame of the CPICH. Here, the starting frame of the HS-PDSCH is delayed by 2 slots from the HS-SCCH or the like in order to enable demodulation of the HS-PDSCH with the demodulation scheme corresponding to the received modulation scheme after the mobile station receives the modulation scheme information via the HS-SCCH.

Moreover, the HS-SCCH, HS-PDSCH form one sub-frame with 3 slots. The mobile station receives the sub-frames of the HS-SCCH and checks transmission of data to the own station. When the data transmitted to the own station is detected, the mobile station receives (demodulates) the HS-PDSCH. When the data transmitted to the own station is not detected, the mobile station does not receive (demodulates) the HS-PDSCH.

The HS-DPCCH is the channel of the up-link and this channel includes the slot (one slot length) for transmitting the ACK/NACK signal as the response signal for verifying reception to the base station from the mobile station after about 7.5 slots from reception of the HS-PDSCH.

Moreover, the HS-DPCCH is also used for periodic feedback transmission of the CQI information for the adaptive modulation control. Here, the CQI information transmitted is calculated, for example, on the basis of the reception environment (for example, the result of the SIR measurement of the CPICH) measured during the slots before four to one slot for CQI transmission.

The Items for HSDPA explained above are disclosed, for example, in the Patent Document "JP-A No. 151558/2000" and Non-Patent Document "3G TS 25. 212 (3rd Generation Partnership Project: Technical Specification Group Radio Access Network; Multiplexing and channel coding (FDD) V6.2.0 (June 2004)".

According to the background art explained above, the searcher is preferentially operated to perform a path search when a new communication channel is set up and when reception quality deteriorates.

However, the time of about 20 ms, for example, is sometimes required for a channel (user) in order to obtain, with higher accuracy, a delay profile generated by accumulation of the correlation value to realize the path search.

As explained above, when the data is transmitted as a burst via the common channel and the reception is verified individually (for example, as the HSDPA), the signal for verifying the reception (ACK signal, NACK signal) which is transmitted individually should be received credibly. However, if the reception quality is deteriorated a little before reception of the signal, the path search cannot catch up with such deterioration even when the path detection is attempted with priority. Accordingly, the signal sometimes fails to be received.

For example, if the signal indicating successful reception (ACK signal) fails to be received, a particular operation such as re-transmission, which is essentially not required, is conducted and thereby transmission efficiency is lowered.

When the NACK signal fails to be received, re-transmission is not determined until a predetermined time has passed, if the waiting time for reception of the reception result is set to the predetermined time, and thereby re-transmission efficiency is also lowered.

SUMMARY OF THE INVENTION

Accordingly, one of the objects of the present invention is to enhance the receiving accuracy for verifying reception when the data is transmitted using the shared channel.

Another object of the present invention is to improve the transmission efficiency by incorporating the path search and the data transmission utilizing the shared channel.

In addition to the objects explained above, the effect of which may be derived from each structure indicated in the best mode for carrying out the present invention but cannot be attained with the related art can also be considered as one of the objects of the present invention.

In one embodiment of the present invention, a radio communication apparatus used for transmitting data to a transmitting destination apparatus selected from a plurality of transmitting destination apparatuses using a shared channel and receiving the reception result from the transmitting destination apparatus, said radio communication apparatus comprises a control unit for controlling the data transmission, and a path search unit for identifying the transmitting destination apparatus as an object of the path search in accordance with control of the data transmission.

Preferably the path search unit utilizes, as the control of the data transmission, management control of the priority sequence selected as the transmitting destination of data via the shared channel.

Preferably the transmitting destination apparatus identified as an object of the path search by the path search unit is selected from the transmitting destination apparatus which is in the condition that synchronization of the received signal from the transmitting destination apparatus is set up.

Preferably the path search unit refers to an accumulating condition of data transmitted via the shared channel at the time of identifying the transmitting destination apparatus as an object of the path search.

Preferably the control unit performs, prior to transmission of data, transmission notice control to transmit the transmission notice signal to the transmitting destination apparatus and utilizes the transmission notice control as the control of data transmission.

In one embodiment of the present invention, a radio communication apparatus used for transmitting data to a transmitting destination apparatus selected from the candidates of a plurality of transmitting destination apparatuses utilizing a shared channel and receiving the reception result from the transmitting destination apparatus, said radio communication apparatus comprises a path search unit for identifying, as an object of the path search, the transmitting destination apparatus for which data being able to be transmitted via the shared channel from the candidates of a plurality of the transmitting destination apparatuses is accumulated, and a control unit for performing data transmission control via the shared channel to receive the response verifying signal from the identified transmitting destination apparatus after completion of the path search for the transmitting destination apparatus identified by at least the path search unit.

In one embodiment of the present invention, a path search assigning unit mounted to the radio communication apparatus for transmitting, by utilizing a shared channel, data to the transmitting destination apparatus selected from a plurality of candidates of transmitting destination apparatus and receiving the reception result from the transmitting destination apparatus, said path search assigning unit comprises an identifying means for identifying a transmitting destination apparatus as an object of the path search in accordance with transmission control of data utilizing the shared channel, and an output means for outputting the information of the identified transmitting destination apparatus.

DETAILED DESCRIPTION OF THE PREFERRED EMBODIMENTS

The embodiments of the present invention will be explained with reference to the accompanying drawings.

[a] First Embodiment

This embodiment identifies a transmitting destination apparatus as the object of the path search in accordance with transmission control of data using the shared channel for the data transmission to the transmitting destination apparatus selected from the candidates of a plurality of transmitting destination apparatuses using the shared channel.

Accordingly, the path search may be conducted for the apparatus which will transmit the response signal in response to receiving the data transmitted via the shared channel.

Namely, the transmission efficiency may be improved by incorporating the transmission control of data using the shared channel and the path search.

As explained above, various communication apparatuses (for example, the radio communication apparatus or the like forming the radio LAN system) may be used for data transmission utilizing the shared channel. However, the radio communication apparatus corresponding to the HSDPA explained previously will be explained as an example.

In this case, the shared channel corresponds to the HS-PDSCH.

[Radio Base Station 1 (Radio Communication Apparatus)]

Figure 2:
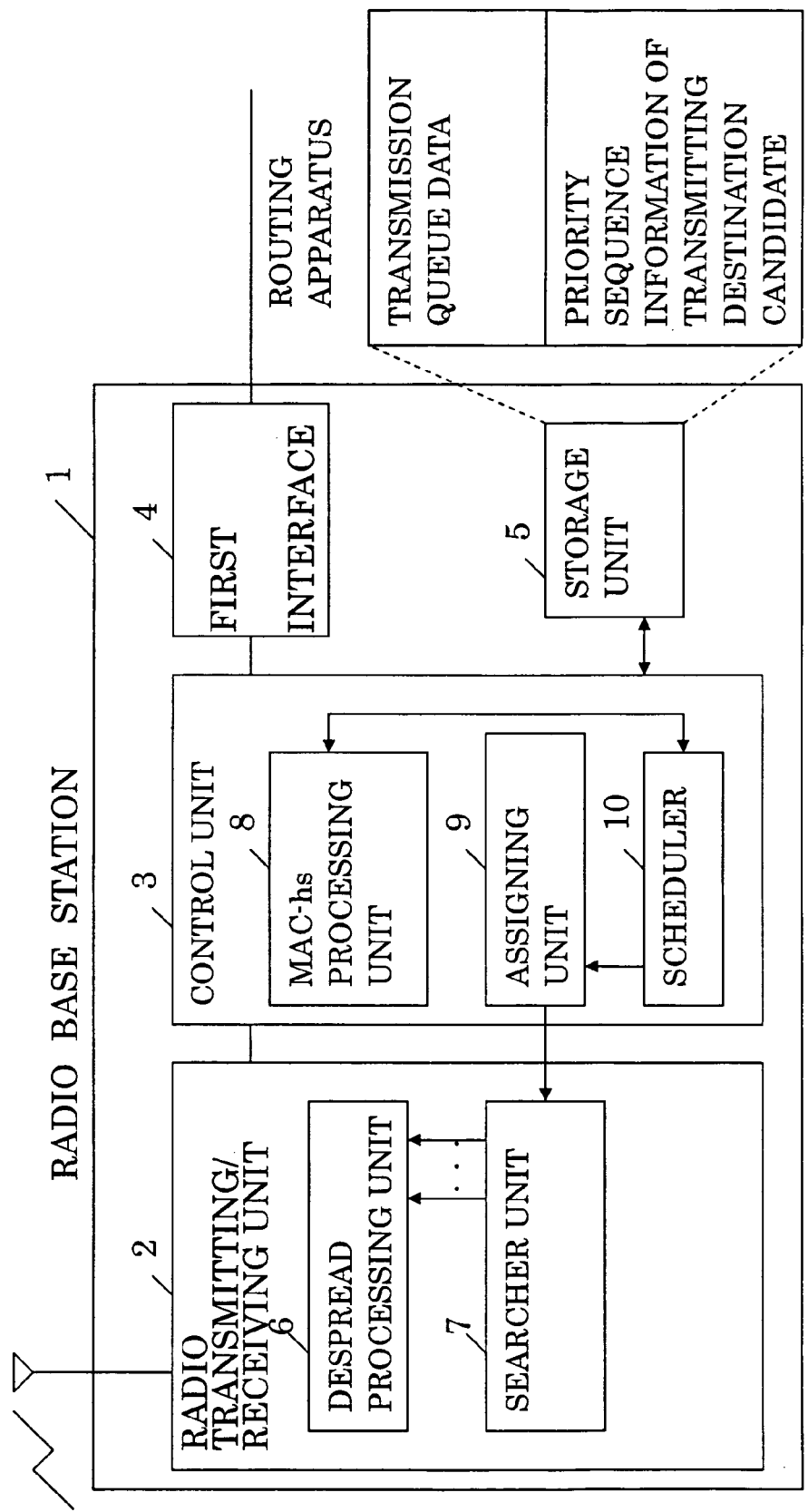
FIG. 2 shows a radio base station in the present invention.

FIG. 2 illustrates a structure of a radio base station corresponding to the HSDPA.

In FIG. 2, the reference numeral 1 denotes a radio base station; 2, a radio transmitting/receiving unit for transmitting and receiving the radio signal to and from mobile stations; 3, a control unit for controlling respective units; 4, a first interface unit for interface to a routing apparatus (ATM exchange, router, base station control apparatus or the like); 5, a storage unit for storing the data transmitted to mobile stations via the shared channel and the priority information of the transmitting destination candidates.

The radio transmitting/receiving unit 2 functions as the transmitting unit of the CPICH, HS-SCCH, HS-PDSCH, and dedicated channels and the receiving unit of the HS-DPCCH and dedicated channels.

The CPICH is the channel with which a mobile station can measure the quality of the down-link required for the adaptive modulation control.

Moreover, the HS-SCCH is the channel for sending a notice for transmission of the data via the HS-PDSCH as the shared channel.

The HS-PDSCH is the channel for transmitting the data such as packet data at a higher transmission rate by adaptively controlling the transmission method in accordance with the CQI information.

The HS-DPCCH is the channel for receiving the CQI information, ACK signal, and NACK signal transmitted from a mobile station.

The dedicated channel is used for channel compensation of the other signal from the mobile station at the time of demodulation (synchronous detection) by transmitting the known signal such as the pilot signal or the like from the mobile station and used for transmitting power control to the mobile station.

As explained previously, the HS-SCCH channel is provided also to send the information (modulation scheme, spreading code information or the like) required for reception of the HS-PDSCH to the mobile station. However, it is also possible to transmit the data via the HS-PDSCH by eliminating the transmission of the information via the HS-SCCH.

Moreover, the radio transmitting/receiving unit 2 is also provided, because of correspondence to the CDMA, with a despread processing unit 6 for implementing the despread process of the receiving signal and a searcher unit 7 for giving the timing of despread detected as the path timing to the despread processing unit 6.

The control unit 3 is provided with a MAC-hs transmission processing unit 8 for execution of the H-ARQ, an assigning unit 9 for designating a mobile station as the object of the path search to the searcher unit 7, and a scheduler 10 for management of the schedule of transmission sequence of the data to be transmitted via the HS-PDSCH stored in the storage unit 5. The assigning unit 9 identifies the path search in accordance with the transmission control of the HS-PDSCH under the management of the scheduler but the practical operations of this unit will be explained later.

The storage unit stores the data in the transmission queue to be transmitted via the HS-PDSCH and the priority information indicating the sequence of preferential selection as the transmitting destination candidates used for scheduling by the scheduler.

[Searcher Unit 7]

Next, the structure of the searcher unit 7 will be explained in detail with reference to FIG. 3.

Figure 3:
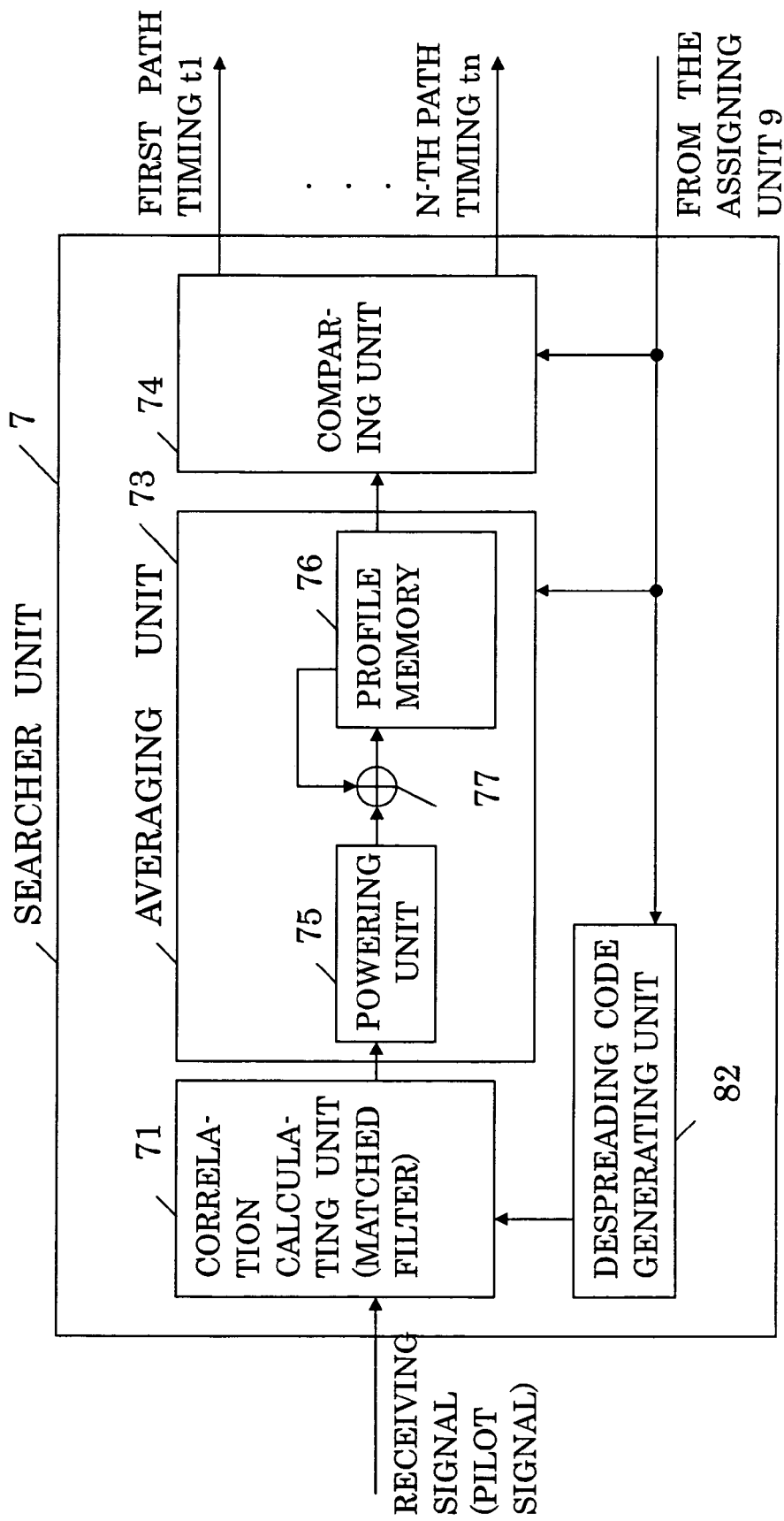
FIG. 3 shows a detailed structure of the searcher unit in the present invention.

FIG. 3 illustrates a detailed structure of the searcher unit 7.

In FIG. 3, reference numeral 71 denotes a correlation calculating unit (matched filter); 72, a despreading code generating unit; 73, an averaging unit; and 74, a comparing unit, respectively.

The correlation calculating unit 71 calculates a correlation value using the receiving signal received via the up-link channel such as the HS-DPCCH and the despreading code input from the despreading code generating unit 72. In this case, as the despreading code, the despreading code corresponding to a mobile station as the object of the path search and the correlation value is calculated by shifting the relative phase relationship (despread timing) between the receiving signal and the despreading code.

The mobile station as the object of the path search (despreading code) may be identified with the assigning unit 9 and the despreading code generating unit 82, averaging unit 73 and comparing unit 74 or the like generate a delay profile of the identified mobile station and operate (conduct the path search) to output the path timing. Accordingly, the assigning unit 9 conducts the path search for the other mobile stations when the other mobile stations (despreading codes) are identified.

The averaging unit 73 converts the correlation value in each phase relationship (despread timing) output from the correlation calculating unit 71 into electrical power information with a powering unit 75 and moreover executes, with an adder 77, the averaging process with the addition of the correlation value stored in a profile memory 76 in order to store the result of addition to the profile memory 76 as a delay profile.

The comparing unit 74 compares an accumulated value of the correlation value at each despread timing and outputs, for example, the significant N path timings (t1 to tn) to the despread processing unit 6.

The maximum value in the kinds of path timing to be output is preferably within the maximum number of fingers (m) which can be assigned with the despread processing unit 5 explained later.

Figure 4:
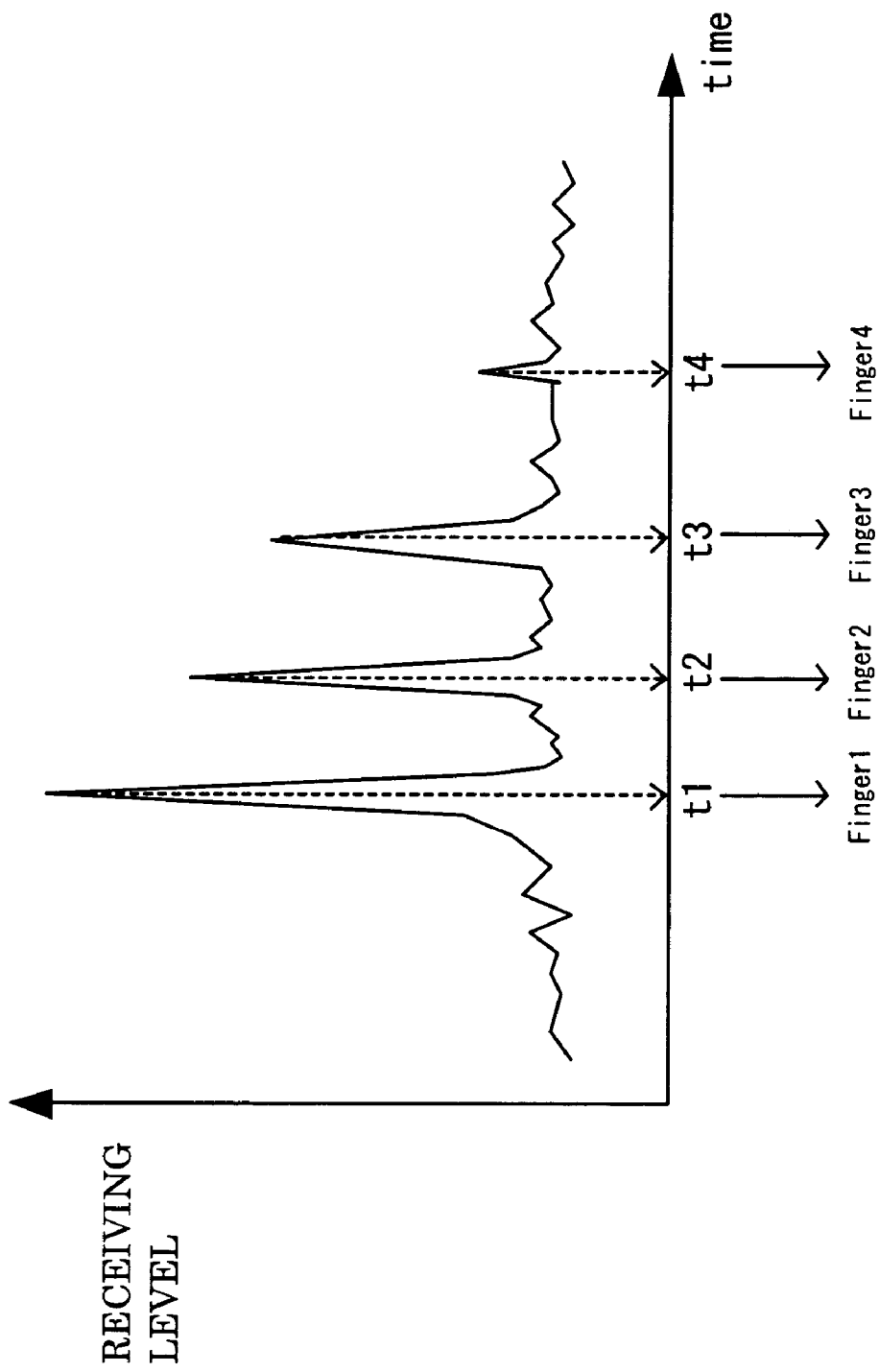
FIG. 4 shows a delay profile in the present invention.

FIG. 4 is a conceptual diagram of a delay profile. In this example, the path timings t1 to t4 correspond to the four significant paths having higher correlation values and are assigned to each finger #1 to #4. Here, the maximum number of fingers is 4.

[Despread Processing Unit 6]

Next, detailed structure of the despread processing unit 6 will be explained with reference to FIG. 5.

Figure 5:
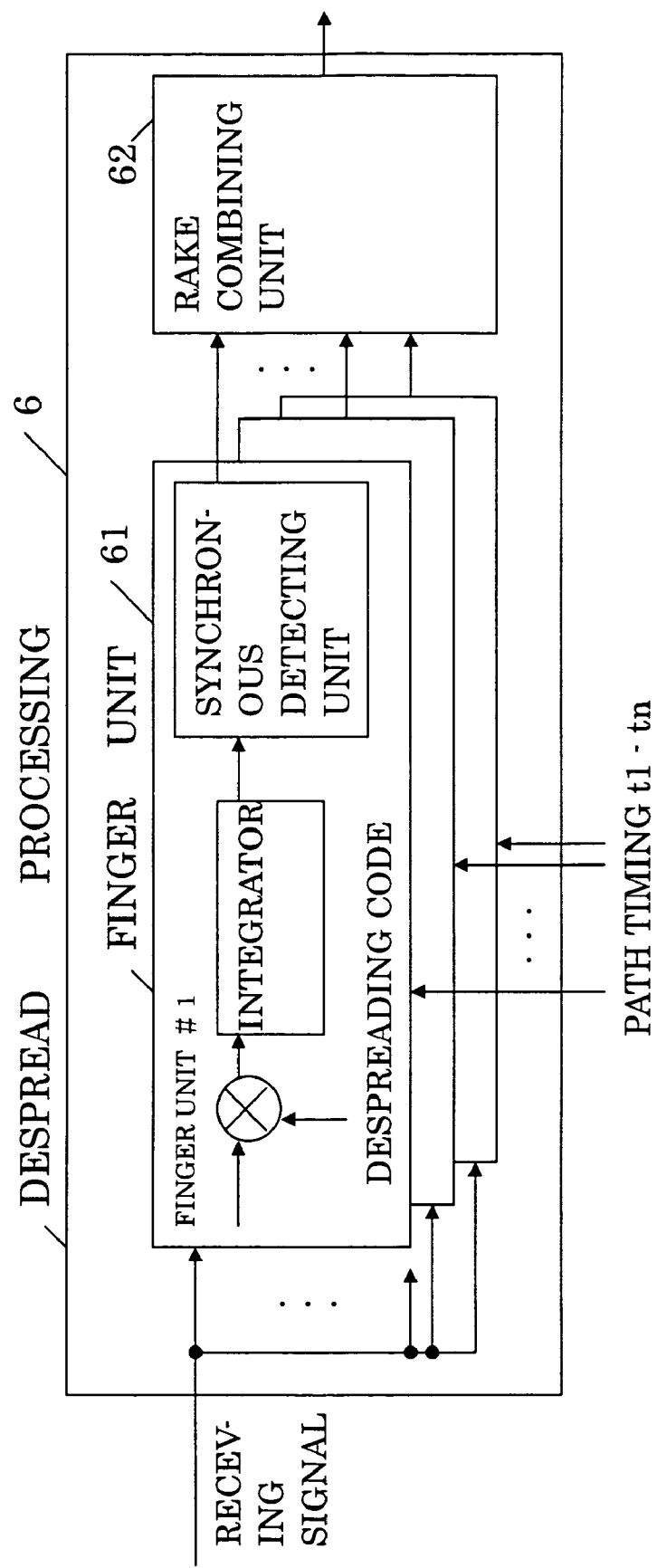
FIG. 5 shows details of inverse spread processing unit in the present invention.

FIG. 5 is a diagram illustrating a detailed structure of the despread processing unit 6.

In FIG. 5, reference numeral 61 denotes a plurality of finger units for despread and synchronous detection corresponding to multi-path for the receiving signal and 62, a RAKE combining unit for outputting the despread signal from each finger unit through RAKE combining and giving the demodulation signal to a signal judging unit and a decoding unit or the like.

Namely, the path timing detected with the searcher unit 7 is input to each finger unit and each finger unit implements the despread by controlling relative phase between the receiving signal and the despreading code to conduct the despreading process in the input path timing.

Finger units whose outputs are combined into one unit through the RAKE combining are the finger units which have conducted despreading for data received via the multi-path. When the data is received from different mobile stations and when the other data systems are received from the same mobile station, a plurality of finger units are assigned for respective data system and the RAKE combining is performed within the same data system.

[Assignment of the Path Search]

Here, the basic time dividing operation of the path search will be explained with reference to FIG. 6.

Figure 6:
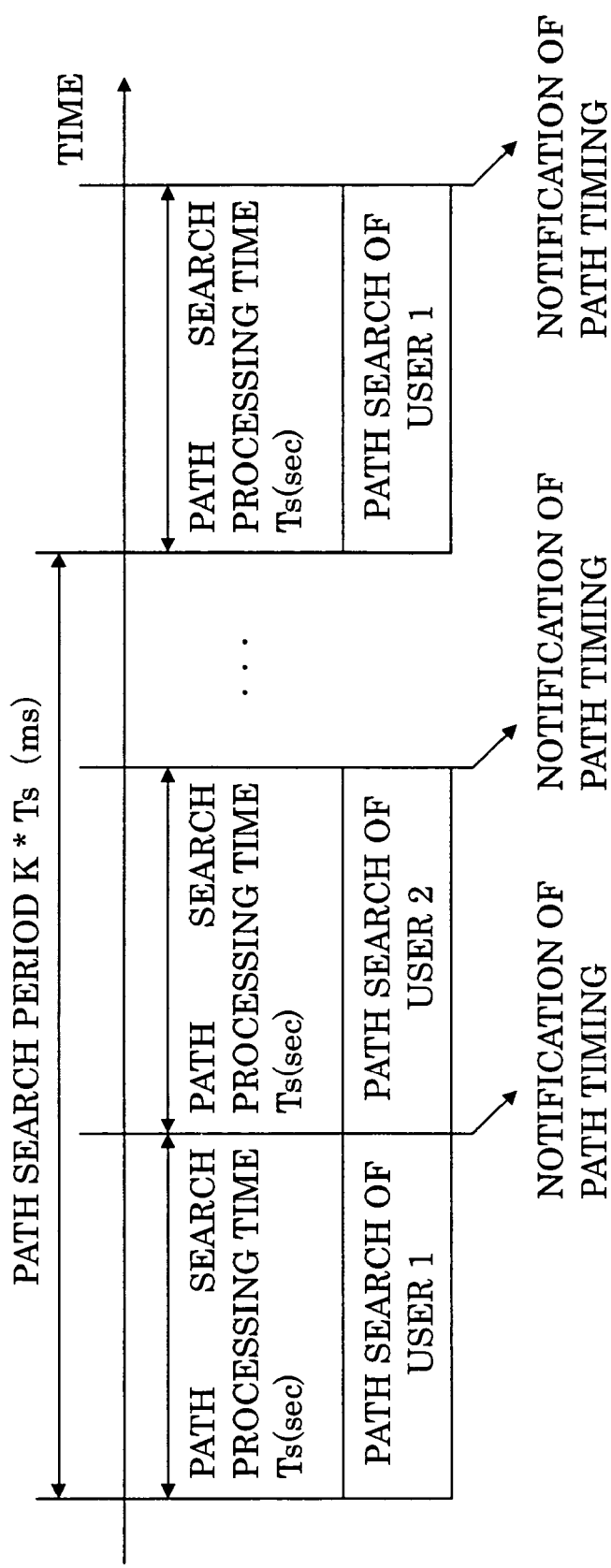
FIG. 6 shows and assignment of the path search in the present invention.

FIG. 6 is a diagram for explaining assignment of the path search.

In this example, the path search is conducted in the searcher 7 using the time of Ts (sec) per user (mobile station) and the object user (mobile station) of the path search is sequentially switched.

Here, when the number of users (mobile stations) as the path search object is K, the path search period of each user is expressed as K*Ts (ms).

Upon completion of the path search, the path timing is output from the searcher 7 corresponding to each user and is then input to the corresponding finger unit 61.

Accordingly, the path search is conducted equally to each user (mobile station) in the constant period and thereby the searcher unit 7 is used in common among a plurality of users.

However, in this embodiment, the path search is assigned in accordance with the transmission control of the HS-PDSCH in the scheduler.

Namely, the scheduler 10 selects a mobile station as the object of the data transmission via the HS-PDSCH from a plurality of mobile stations as the transmitting destination candidates, sends a transmission notice to the selected mobile station via the HS-SCCH, and controls, after two slots, the radio transmitting/receiving unit 2 to actually transmit the data in the transmission method designated by the HS-SCCH via the HS-PDSCH.

A plurality of mobile stations as the transmitting destination candidates are the mobile stations under the HSDPA service and are allowed, for example, to be accepted by the mobile network because these mobile stations have already issued the HSDPA service requests.

Therefore, the scheduler 10 sends the information (the spreading code information used for transmission by the relevant mobile station) for identifying the mobile station to which the radio base station 1 is trying to transmit the data via the HS-PDSCH to the assigning unit 9.

The assigning unit 9 instructs the searcher unit 7 to conduct the path search for the mobile station indicated by the scheduler 10.

For example, when it is assumed that the assigning unit 9 is informed of the identification information of user 1 by the scheduler 10 during the path search of user 1 in FIG. 6, the searcher unit 7 executes the path search of user 1, at the time of the next path search, in place of the path search of user 2.

In this case, it is desirable to set the period of the path search after identification of the relevant mobile station in order to complete the path search until reception of the ACK signal, NACK signal from this mobile station.

Figure 1:
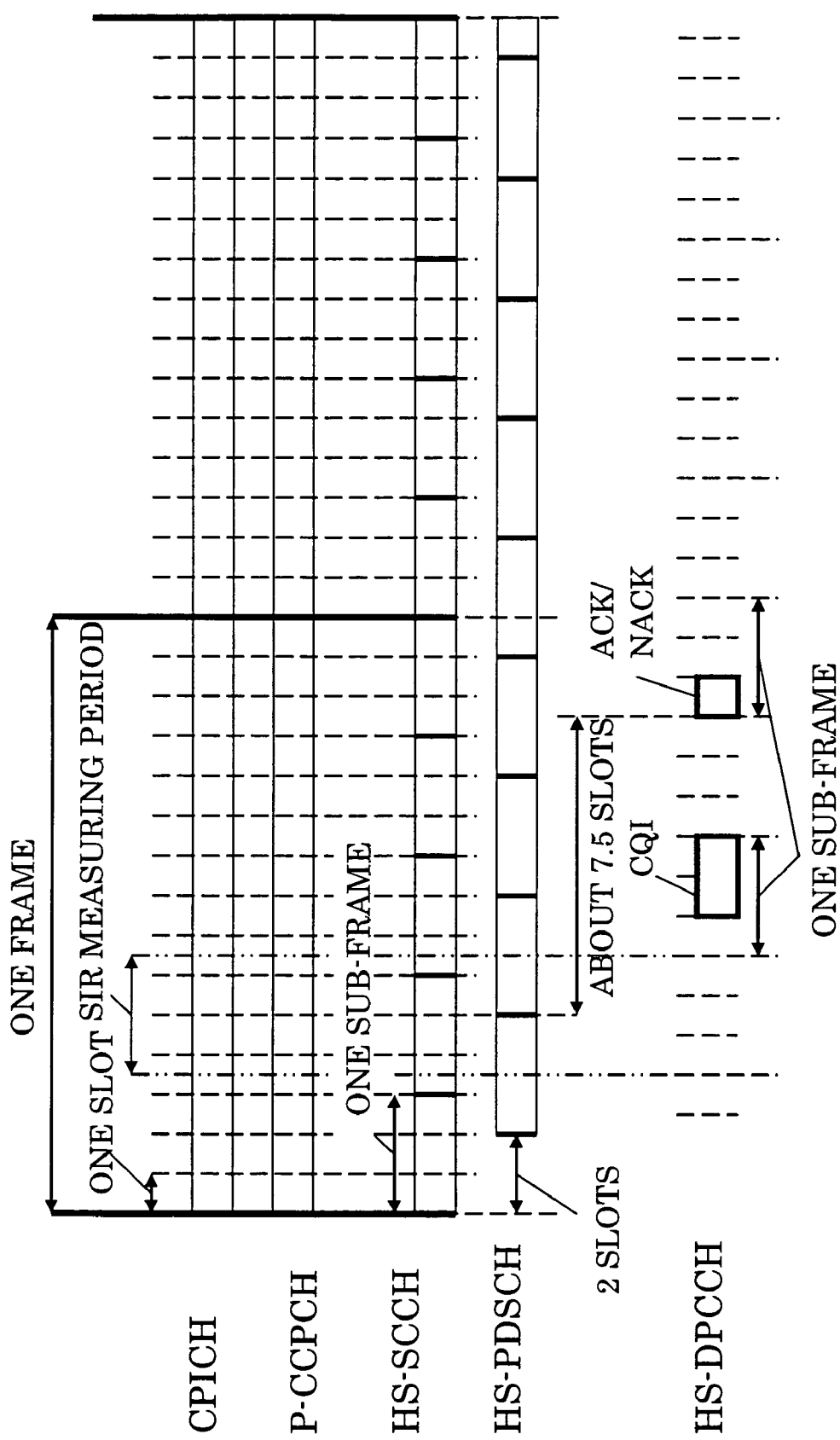
FIG. 1 shows a channel format in the HSDPA.

In an example of FIG. 1, since the time until reception of the ACK signal (NACK signal) from transmission of the HS-SCCH is less than 10 ms, if 20 ms is required for the path search, it is desirable that the mobile station is identified before transmission of the HS-SCCH (for example, 20 ms before reception of the ACK signal, NACK signal).

If such quick identification is difficult, accuracy of the delay profile is likely to be lowered but it may be recovered by shortening the period of the path search. However, it is desirable that the mobile station is identified before at least the period T>0 of the path search from reception of the ACK signal or NACK signal.

Moreover, following method may be thought of as the one to realize quick identification of a mobile station.

For example, when management control of the priority sequence is performed as a part of the transmission control of the HS-PDSCH by storing the priority sequence of a plurality of mobile stations as the candidates of the data transmitting destination via the HS-PDSCH to the storage unit 5, the scheduler 10 utilizes this priority sequence information.

Namely, the assigning unit 9 acquires the information to identify the mobile station in the higher priority sequence from the scheduler 10 provided for management of the priority sequence information for transmission of the HS-PDSCH.

Therefore, the searcher unit 7 is controlled, as in the case of the preceding example, to conduct the path search for the mobile station identified with this information acquired.

In this case, in regard to selection of a mobile station as the destination of data transmission via the HS-PDSCH, the scheduler 10 should desirably select the mobile station of the higher priority sequence as the transmitting destination candidate of the HS-PDSCH stored in the storage unit 5.

The reason is that the scheduler 10 can identify the mobile station which will soon become the transmitting destination with a higher probability even under the condition that the mobile station as the destination of the data transmission via the HS-PDSCH is not yet identified.

Accordingly, the searcher unit 7 is capable of conducting the path search with priority to the mobile station which will receive the ACK signal (NACK signal) through data transmission via the HS-PDSCH, lowering the probability that unwanted re-transmission control is performed because reception cannot be verified.

[Mobile Station 15]

Next, the mobile station corresponding to the HSDPA will be explained with reference to FIG. 7.

Figure 7:
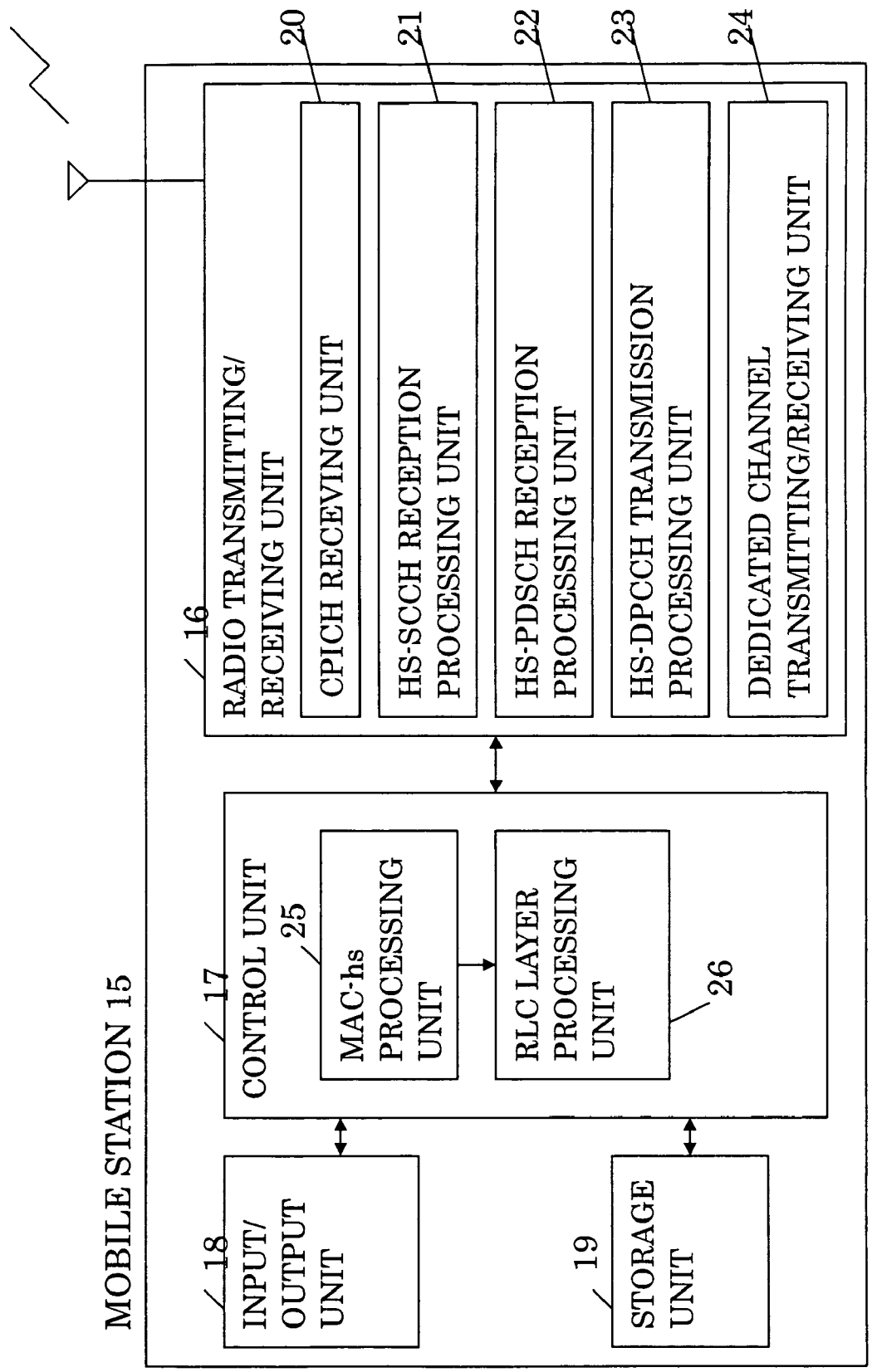
FIG. 7 shows a mobile station in the present invention.

In FIG. 7, the reference numeral 15 denotes a mobile station; 16, the radio transmitting/receiving unit for transmitting and receiving the radio signal to and from the radio base station 1; 17, the control unit for controlling respective units; 18, an input/output unit for inputting the information such as various setting information pieces or the like; 19, the storage unit for storing the CQI table indicating correspondence between the receiving quality of the CPICH and the CQI information and the received data in which a CRC error is detected (the data received via the HS-PDSCH) in order to realize the H-ARQ.

Moreover, the radio transmitting/receiving unit 16 includes a CPICH receiving unit 20 provided corresponding to each processing unit of the radio transmitting/receiving unit 2 of the radio base station 1, an HS-SCCH reception processing unit 21, an HS-PDSCH reception processing unit 22, an HS-DPCCH transmission processing unit 23, and a dedicated channel transmitting/receiving unit 24.

On the other hand, the control unit 17 is provided with a MAC-hs processing unit 25 for conducting the operation control or the like of the H-ARQ, an RLC layer processing unit 26, and a mode control unit 26 [NOTE: MODE CONTROL UNIT IS NOT SHOWN IN DRAWING, ALSO, REFERENCE NUMERAL CONFLICT WITH RLC UNIT 26] provided with the function to control the modes explained later or the like.

With the structure explained above, the mobile station 15 receives the data which is delayed by two slots via the HS-PDSCH when it has received a transmission notice via the HS-SCCH and transmits the reception result to the radio base station 1 as the ACK signal (NACK signal).

Moreover, the dedicated channel transmitting/receiving unit 24 enables the path search in each slot within the base station 1 by continuously transmitting the pilot signal.

The structures of the radio base station and mobile station in relation to this embodiment have been explained above.

Next, the path search assigning control (1 to 4) in the searcher unit 7 will be explained with reference to the flowcharts.

[Assigning Method (1)]

Figure 8:
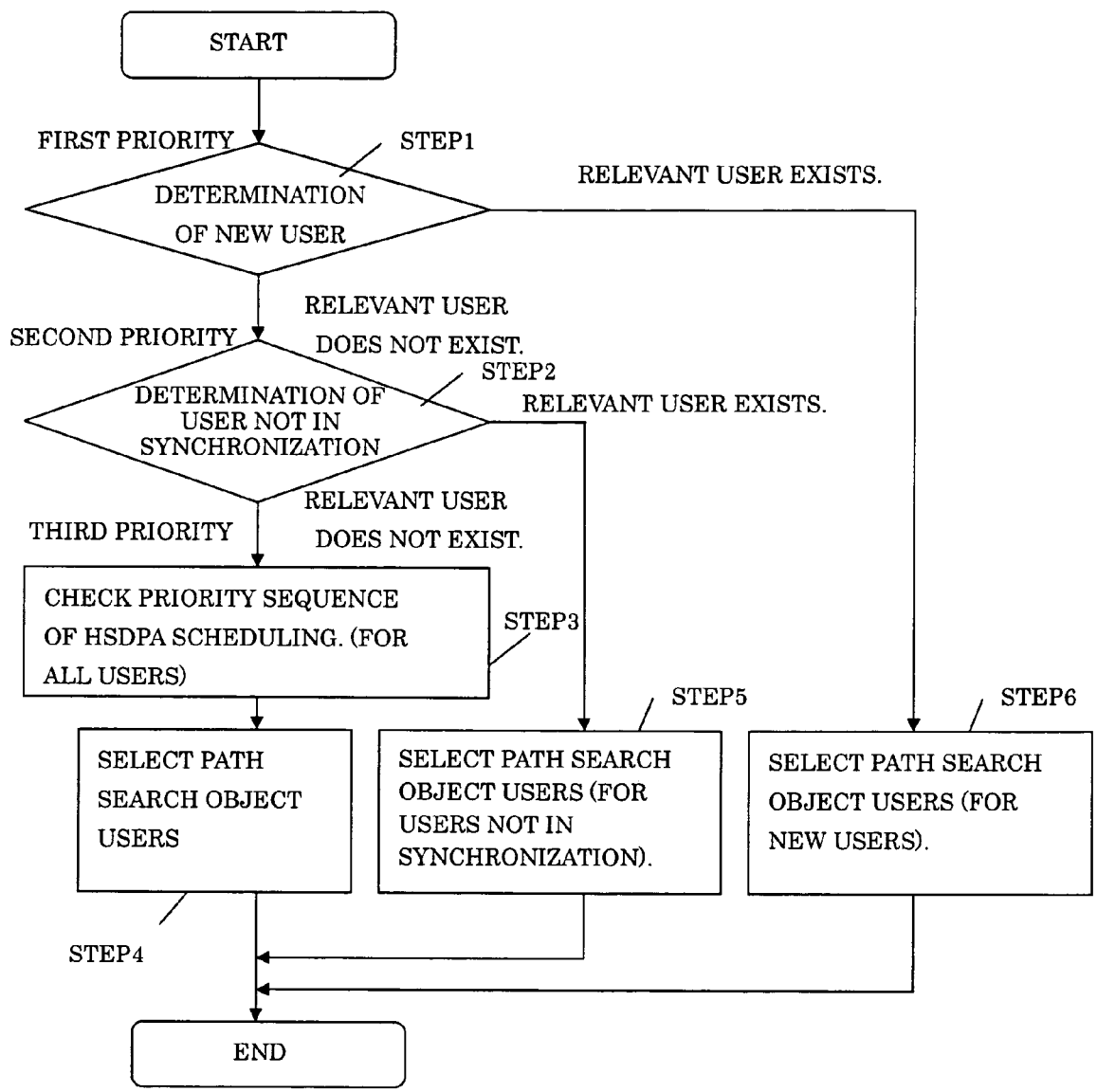
FIG. 8 shows an assigning method (1) in the present invention.

FIG. 8 is a flowchart for explaining the assigning control in the assigning unit 9.

In order to identify the mobile station as the object of the path search, the assigning unit 9 judges, in step 1, whether a new user (mobile station) having issued a new communication request (for example, the HSDPA service request) exists or not. When the new user (mobile station) exists, the process goes to step 6 to identify the new user (mobile station) selected equally from the new users (mobile stations) and then sends a notice to the searcher unit 7 to determine the identified mobile station as the object of the path search.

Meanwhile, when it is determined in step 1 that a new user (mobile station) does not exist, the process goes to step 2 to determine whether a user (mobile station) which is not in radio synchronization exists or not. Establishment of radio synchronization may be easily detected in the radio transmitting/receiving unit 2 when a correlation value of the delay profile is uniformly lower or when the synchronization word is mismatched.

Here, when it is determined that a user (mobile station), which not in synchronization exists, the process goes to step 5 to identify the user (mobile station) equally selected from the users (mobile stations) not in synchronization and then to send a notice to the searcher unit 7 to determine the identified mobile station as the object of the path search.

On the other hand, when it is determined that the user (mobile station) not in the synchronization does not exist, the process goes to step 3 to identify the user (mobile station) in accordance with the transmission control by the scheduler 10 and to send a notice to the searcher unit 7 to determine the identified mobile station as the object of the path search (step 4).

For example, the mobile station in the highest priority sequence is selected from a plurality of mobile stations under the HSDPA service (waiting for the data via the HS-PDSCH) on the basis of the priority sequence information in the storage unit 5.

Accordingly, the path search is performed effectively because a new user and a user not in synchronization which require the path search have the higher priority as the candidates of the path search.

[Assigning Method (2)]

Figure 9:
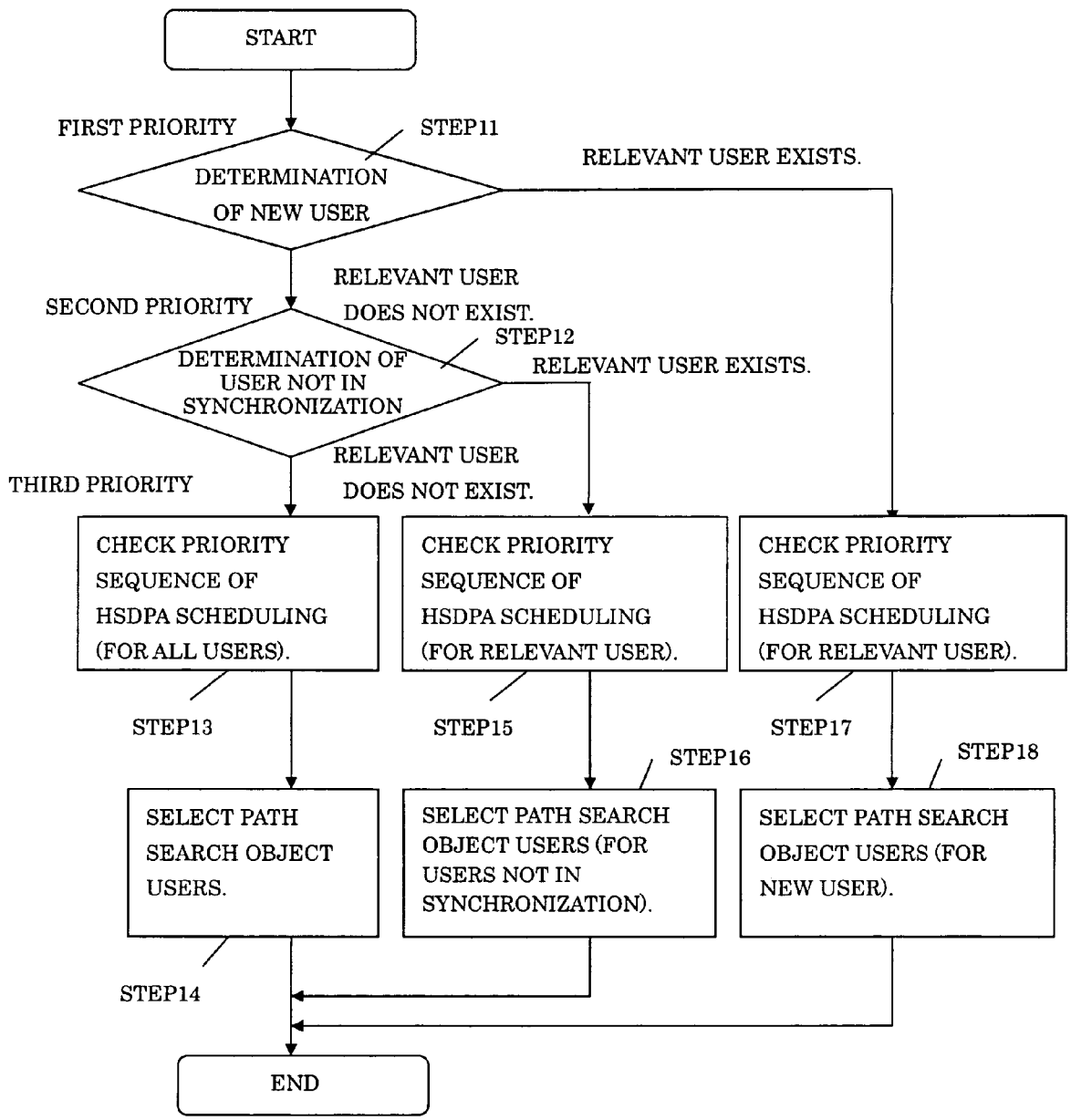
FIG. 9 shows an assigning method (2) in the present invention.

FIG. 9 is a flowchart for explaining the assigning control in the assigning unit 9.

In comparison with the flowchart of FIG. 8, the processes to be conducted when it is determined, in the determination for a new user and a user not in synchronization, that a new user exists or a user not in synchronization exists are changed.

Therefore, such change will be explained and the other processes are covered with the explanation of FIG. 8.

When it is determined in step 11 that a new user (mobile station) exists, the process goes to step 17. Here, the transmission control of the HS-PDSCH in the scheduler 10 is considered.

Namely, the assigning unit 9 identifies the mobile station which will conduct transmission (assumed to make the transmission) of the HS-PDSCH using the priority sequence information or the like and also controls the searcher unit 7 to conduct a path search for the identified mobile station.

The transmission control of the HS-PDSCH is also considered when it is determined in step 12 that the user not in synchronization exists.

Accordingly, the path search is conducted for the mobile station in the HSDPA service with higher priority than the mobile station not in the HSDPA service and moreover, the mobile station with the higher probability for the HS-PDSCH transmission may be easily selected as the object of the path search.

[Assigning Method (3)]

Figure 10:
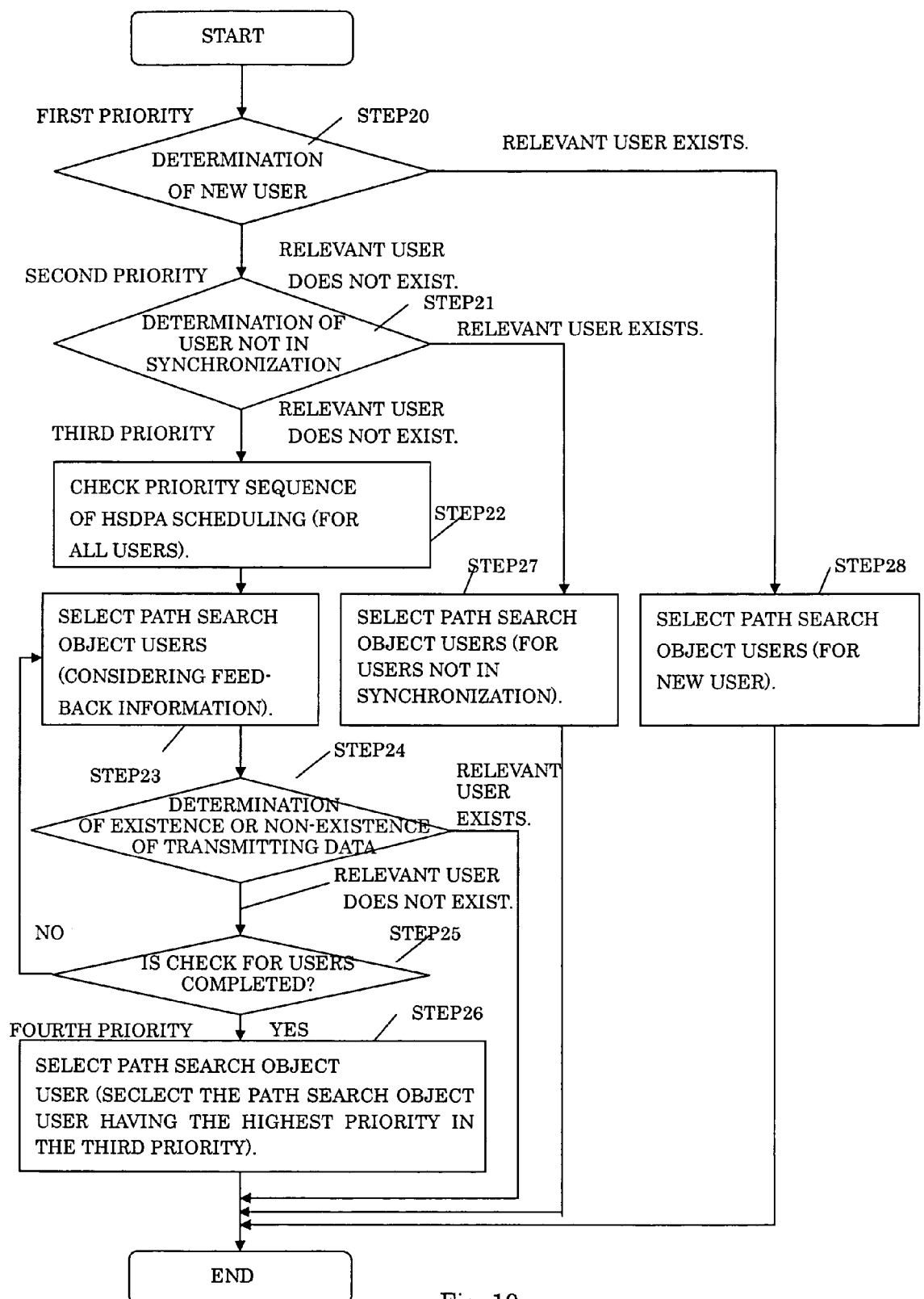
FIG. 10 shows an assigning method (3) in the present invention.

FIG. 10 is a flowchart for explaining the assigning control in the assigning unit 9.

In comparison with the flowchart of FIG. 8, the processes to be conducted when it is determined, in the determination of a new user or a user not in synchronization, that a new user or a user not in synchronization does not exist are changed.

Accordingly, such changes are explained and the other processes are covered with the explanation of FIG. 8.

When it is determined in steps 20 and 21 that a new user (mobile station) does not exist and a user not in synchronization does not exist, the process goes to step 22. Here, consideration is taken into the transmission control of the HS-PDSCH in the scheduler 10.

Namely, the assigning unit 9 checks, in step 22, the contents of priority sequence information of the mobile station to which the transmission via the HS-PDSCH will (may) be conducted.

Here, the path search object user selecting process is conducted sequentially to the mobile stations in accordance with the priority sequence (step 23).

Namely, it is determined in step 24 whether the data to be transmitted via the HS-PDSCH to the user (mobile station) having the highest priority sequence is stored in the storage unit 5 or not. When the data to be transmitted exists, this mobile station is identified as the object of the path search and it is then notified to the searcher unit 7.

However, if such data to be transmitted does not exist, the process goes to step 25 to check whether determination in step 24 has been conducted or not for all mobile stations as the transmission candidates of the HS-PDSCH. When this determination is not yet completed, the process returns to step 23 to make the determination of step 24 for the mobile station of the next priority sequence.

However, when it is determined in step 25 that the determination in step 24 has been conducted for all mobile stations as the transmission candidates of the HS-PDSCH, the process goes to step 26.

In this case, the control is conducted, not depending on the existence or no-existence of data, to perform the path search for the mobile stations in the higher priority sequence.

Accordingly, the path search may be executed easily to the mobile stations in higher probability for selection as the transmitting destination of the HS-PDSCH. However, if the data to be transmitted does not exist inherently, it becomes difficult the relevant mobile station is selected as the object of the path search and thereby efficiency can be improved.

[Assigning Method (4)]

Figure 11:
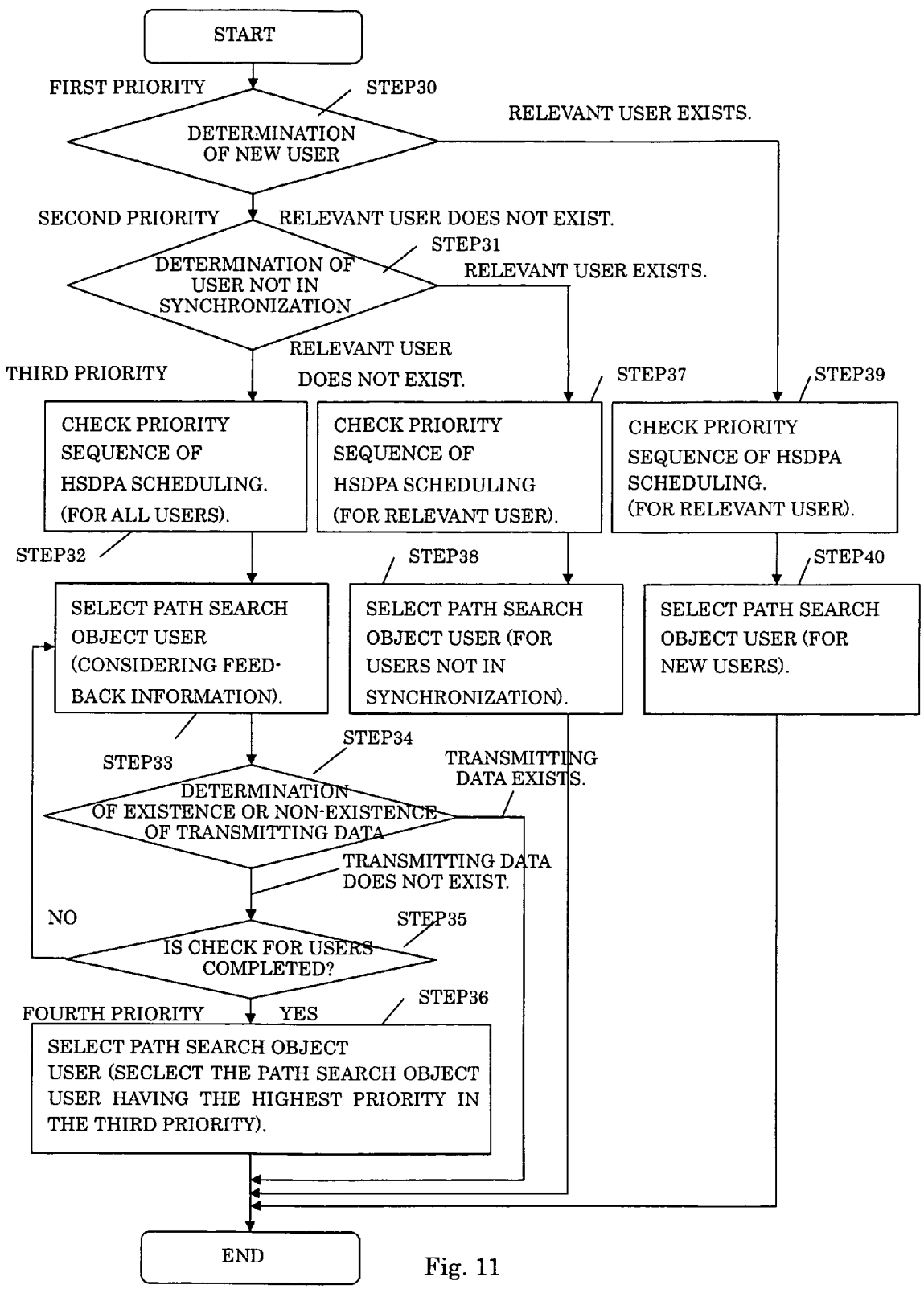
FIG. 11 shows an assigning method (4) in the present invention.

FIG. 11 is a flowchart for explaining the assigning control in the assigning unit 9.

Basically, steps 27 and 28 in the assigning method of FIG. 10 are replaced with steps 37 to 40. This part, however, has been explained with reference to FIG. 9. Therefore, explanation with reference to FIG. 9 and FIG. 10 are also applied to FIG. 11 of which detailed explanation is omitted here.

Here, it should be noted here that the determination of new user and determination of the user not in the synchronization can be omitted in any one of these or in both thereof.

[Others]

Control of transmission schedule of the HS-PDSCH based on the path search control will be explained finally.

In the preceding embodiment, the path search control is executed in accordance with the transmission control of the HS-PDSCH, but this relationship may also be inverted.

Namely, the searcher unit 7 notifies, to the scheduler 10 via the assigning unit 9, the mobile station (user) for which the path search has been conducted or the mobile station (user) having the good result of the path search.

Here, good result of the path search corresponds to the cases where the path obtaining the correlation higher than the predetermined reference value is included in the delay profile or a plurality of paths have been detected as the paths obtaining the correlation higher than the predetermined reference value.

The scheduler 10 controls the notified mobile stations to easily perform transmission of the HS-PDSCH.

For example, it is considered to update the priority sequence information in the storage unit 5 and to raise the priority sequence of the notified mobile station.

Preferably, a flag is set (F is stored for the predetermined period in the corresponding data region in the storage unit 5) for the predetermined period to the mobile for which the path search station has been conducted and the priority sequence of the mobile station storing F is raised for the predetermined sequence at the time of checking the priority sequence.

Accordingly, selection by the scheduler becomes easier only for the predetermined period from the path search and thereafter the condition similar to that of the other mobile stations is adopted because reliability of the path search result is lowered.

As a result, it is now possible to ease the condition that only the quality of down-link such as the CQI information or the like is good but the path search result is not so good for the up-link and thereby the reception error is generated only in the ACK signal (NACK signal) and re-transmission is generated.

In the embodiment explained above, the update control of the priority sequence to lower the priority sequence to the mobile station having conducted transmission of the HS-PDSCH can also be realized.

According to the present invention, receiving accuracy for verifying reception can be enhanced for data transmission utilizing the shared channel.

Moreover, according to the present invention, transmission efficiency can be improved by incorporation of the path search and data transmission using the shared channel.

What is claimed is:

1. A radio communication apparatus for transmitting data to a transmitting destination apparatus selected from a plurality of transmitting destination apparatuses using a shared channel and receiving a reception result from the transmitting destination apparatus, said radio communication apparatus comprising:
   a storage unit for storing priority sequence information indicative of a prioritized sequence for a plurality of transmitting destination apparatuses such that the radio communication apparatus receives a response signal from the transmitting destination apparatus associated with a high priority via data transmission over the shared channel;
   a control unit for selecting one transmission destination apparatus from the plurality of transmitting destination apparatuses, said selecting based at least in part on said priority sequence information and for enabling data transmission to the one transmitting destination apparatus, wherein said selecting performed by the control unit is realized by:
      first-selecting the one transmission destination apparatus from a first group included in the plurality of transmitting destination apparatuses, said first group of transmitting destination apparatuses having radio synchronization established;
      in the absence of any candidate transmitting destination apparatuses from said first group, second-selecting the one transmission destination apparatus from a second group included in the plurality of transmitting destination apparatuses, said second group of transmitting destination apparatuses having no radio synchronization established; and
      in the absence of any candidate transmitting destination apparatuses from said first and second groups, third-selecting the one transmission destination apparatus from the plurality of transmitting destination apparatuses in accordance with a priority sequence for High Speed Downlink Packet Access scheduling; and
   a path search unit for searching a path for the one transmitting destination apparatus selected by the control unit.

2. The radio communication apparatus according to claim 1, wherein the control unit selects the one transmitting destination apparatus identified as an object of the path search by the path search unit from the plurality of transmitting destination apparatuses which transmitting destination apparatus is in a condition that synchronization of the response signal from the transmitting destination apparatus is set up.

3. The radio communication apparatus according to claim 1, wherein the path search unit refers to an accumulating condition of data transmitted via the shared channel at the time of searching the path for the transmitting destination apparatus.

4. The radio communication apparatus according to claim 1, wherein the control unit sends a transmission notice to the selected transmitting destination apparatus.

5. The radio communication apparatus according to claim 4, wherein the control unit performs data transmission control to receive the response signal from the transmitting destination apparatus for which the path search unit searches the path, after completion of the path search for the transmitting destination apparatus.

6. The radio communication apparatus according to claim 1, wherein the control unit performs said first-selecting in accordance with a priority sequence for High Speed Downlink Packet Access scheduling for said first group, and wherein the control unit performs said second-selecting in accordance with a priority sequence for High Speed Downlink Packet Access scheduling for said second group.

7. The radio communication apparatus according to claim 6, wherein the path search unit, in response to said third-selecting the transmission destination apparatus from the plurality of transmitting destination apparatuses in accordance with the priority sequence for High Speed Downlink Packet Access scheduling, further performs:
   determining whether data exists in the storage unit for transmission to the transmitting destination apparatus having a higher priority in the priority sequence than any other transmitting destination apparatus of said plurality of transmitting destination apparatuses for which data for transmission exists in said storage unit;
   when data does not exist for the transmission destination apparatus, searching a path for a transmitting destination apparatus having a highest priority in the priority sequence.

8. The radio communication apparatus according to claim 1, wherein the path search unit, in response to said third-selecting the transmission destination apparatus from the plurality of transmitting destination apparatuses in accordance with the priority sequence for High Speed Downlink Packet Access scheduling, further performs:
   determining whether data exists in the storage unit for transmission to the transmitting destination apparatus having a higher priority in the priority sequence than any other transmitting destination apparatus of said plurality of transmitting destination apparatuses for which data for transmission exists in said storage unit;
   when data does not exist for the transmission destination apparatus, searching a path for a transmitting destination apparatus having a highest priority in the priority sequence.

9. A control unit included in a radio communication apparatus for transmitting, by utilizing a shared channel, data to a transmitting destination apparatus selected from a plurality of transmitting destination apparatuses and receiving a reception result from the transmitting destination apparatus, said control unit comprising:
   selecting means operable for selecting a transmitting destination apparatus from the plurality of transmitting destination apparatuses as an object of a path search in accordance with transmission control of data utilizing the shared channel, based on priority sequence information indicative of a prioritized sequence for a plurality of transmitting destination apparatuses such that the radio communication apparatus receives a response signal from the transmitting destination apparatus associated with a high priority via data transmission over the shared channel, wherein said selecting performed by the selecting means is realized by:

first-selecting the transmission destination apparatus from a first group included in the plurality of transmitting destination apparatuses, said first group of transmitting destination apparatuses having radio synchronization established;

in the absence of any candidate transmitting destination apparatuses from said first group, second-selecting the transmission destination apparatus from a second group included in the plurality of transmitting destination apparatuses, said second group of transmitting destination apparatuses having no radio synchronization established; and in the absence of any candidate transmitting destination apparatuses from said first and second groups, third-selecting the transmission destination apparatus from the plurality of transmitting destination apparatuses in accordance with a priority sequence for High Speed Downlink Packet Access scheduling; and an output means for outputting the information of the selected transmitting destination apparatus.

* * * * *